(12) United States Patent
Veasey, III

(10) Patent No.: US 9,573,603 B2
(45) Date of Patent: Feb. 21, 2017

(54) RAILCAR SEALS (RAPID WRAP™) AND RELATED METHODS

(71) Applicant: Robert Veasey, III, Houston, TX (US)

(72) Inventor: Robert Veasey, III, Houston, TX (US)

( * ) Notice: Subject to any disclaimer, the term of this patent is extended or adjusted under 35 U.S.C. 154(b) by 5 days.

(21) Appl. No.: 13/909,273

(22) Filed: Jun. 4, 2013

(65) Prior Publication Data

US 2014/0352571 A1 Dec. 4, 2014

(51) Int. Cl.
*B61D 7/00* (2006.01)
*B61D 39/00* (2006.01)
*B32B 7/12* (2006.01)
*B32B 27/06* (2006.01)

(52) U.S. Cl.
CPC . *B61D 7/00* (2013.01); *B32B 7/12* (2013.01); *B32B 27/06* (2013.01); *B61D 39/008* (2013.01); *B32B 2581/00* (2013.01); *Y10T 156/10* (2015.01)

(58) Field of Classification Search
CPC ..... B65D 77/003; B65D 2313/08; B61D 7/00; B61D 39/00
See application file for complete search history.

(56) References Cited

U.S. PATENT DOCUMENTS

| | | | | |
|---|---|---|---|---|
| 991,267 A | * | 5/1911 | Brandenberger | 425/71 |
| 2,950,992 A | * | 8/1960 | Brillhart et al. | 428/536 |
| 3,057,756 A | * | 10/1962 | Cornwell | 428/452 |
| 3,839,074 A | * | 10/1974 | Taylor | 428/510 |
| 4,239,008 A | * | 12/1980 | Conlon | 105/377.08 |
| 4,601,245 A | * | 7/1986 | Kleykamp | 105/377.08 |
| 4,796,538 A | * | 1/1989 | McLean et al. | 105/377.08 |
| 5,565,048 A | * | 10/1996 | Lee et al. | 156/60 |
| 5,609,555 A | * | 3/1997 | Lee et al. | 493/210 |
| 6,761,298 B1 | * | 7/2004 | Cantrell | 225/42 |
| 2004/0187728 A1 | * | 9/2004 | Gaydos et al. | 105/377.08 |
| 2007/0023436 A1 | * | 2/2007 | Sierra-Gomez et al. | 220/359.2 |
| 2010/0258032 A1 | * | 10/2010 | Haymond et al. | 105/377.07 |
| 2010/0264151 A1 | * | 10/2010 | Reddy-Wynn | 220/729 |
| 2011/0180447 A1 | * | 7/2011 | Wakai et al. | 206/524.3 |
| 2011/0311688 A1 | * | 12/2011 | Becraft et al. | 426/111 |
| 2014/0352571 A1 | * | 12/2014 | Veasey, III | 105/377.08 |

* cited by examiner

*Primary Examiner* — Jason C Smith
(74) *Attorney, Agent, or Firm* — Buche & Associates, P.C.; John K. Buche; Bryce A. Johnson

(57) ABSTRACT

Generally disclosed is an adhesively secured seal and related methods for sealing a hopper car hatch without the risk of contaminating the hopper car load with food-grade adhesive and without damaging the hopper car or requiring excessive cleaning when removed. The disclosed seal comprises a piece or sheet of plastic with self-contained food-grade adhesive. Preferably, the plastic is cut to fit the length of the hatch of a rail car and features food-grade adhesive along on its surface its edges. In another embodiment, the apparatus is rolled, like tape, wherein the apparatus is installed over a hatch opening so that the sides of the apparatus containing food-grade adhesive are contacted with the rim and sides of the hatch.

9 Claims, 2 Drawing Sheets

RAILCAR SEALS (RAPID WRAP™) AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of Invention

The subject matter described herein is in the field of railcar and barge seals and related methods. More specifically, said subject matter is in the field of covered hopper car and barge seals and related methods.

Background of the Invention

A covered hopper car is a railcar with at least one load bay defined by a cover, sidewalls, and a four-way tapered or funnel-like floor with a spout. Usually, covered hopper cars are suitable for transporting loose and dry bulk commodities, like grain, because the (1) the roof protects the commodities from weather; and (2) the commodities may be easily unloaded from the hopper car via opening the spout at the deepest point of the floor so that the commodity may flow therethrough via gravity or vacuum. Loading hopper cars is accomplished by dumping, e.g., via a grain conveyor, the loose bulk commodities through a hatch in the roof (a hatch can be defined by either a man-hole sized opening or a narrow opening along the center of the roof).

In the U.S., the load of a hopper car, e.g. grains, rice or corn, must be fumigated during transportation per regulations of the USDA. USDA regulations further require that the hatches of fumigated hopper cars be sealed. Until now, a common seal has been a large piece of plastic that is applied to the rim and sides of a hopper car hatch. Problems arise when applying the plastic seal to the hatch because, for such seals, (a) the USDA regulations require that the plastic be applied to the hatch via an adhesive, usually provided via spray or tape, and (b) use of an adhesive in this manner requires pre-cleaning of the rim and multiple laborers to install the seal (e.g., one for applying the adhesive and one for applying the plastic seal) and can result in inadvertent contamination of the hopper car load with the adhesive. Furthermore, many adhesives leave a residue on the hopper car hatch after removal of the seal and said residue can result in erosion of hopper car paint, damage to rubber gaskets on the cover, or require excessive and expensive cleaning regimens. Thus, a need exists for an easy to install seal for hopper car hatches which does not risk contamination of the hopper load, damage the hopper car, or require excessive cleaning.

SUMMARY OF THE INVENTION

In view of the foregoing, it is an objective of this disclosure to describe apparatus and related methods for sealing hopper car hatches without the risk of contaminating the hopper load with adhesive and without damaging the hopper car or requiring excessive cleaning when removed. In one embodiment, the disclosed apparatus comprises a piece or sheet of plastic with self contained adhesive. The plastic may be cut to fit the length of the hatch of a railcar and features food-grade adhesive, as required by the USDA, along its edges. In another embodiment, the apparatus is rolled, like tape, wherein the apparatus is installed over a hatch opening so that the sides of the apparatus containing adhesive are contacted with the rim and sides of the hatch.

BRIEF DESCRIPTION OF THE FIGURES

Other objectives of the invention will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of the disclosed apparatus and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Generally disclosed is an adhesively secured seal and related methods for sealing a hopper car hatch without the risk of contaminating the hopper car load with adhesive damaging the hopper car, or requiring excessive cleaning when removed. The disclosed seal comprises a sheet of plastic with self contained adhesive. The plastic may be cut to fit the length of the hatch of a railcar and features food-grade adhesive along its edges. In another embodiment, the apparatus is rolled, like tape, wherein the apparatus is installed over a hatch opening so that the sides of the apparatus containing adhesive are contacted with the rim and sides of the hatch. The more specific details of a preferred embodiment of the disclosed seal are described with reference to the figures.

Figure 1:
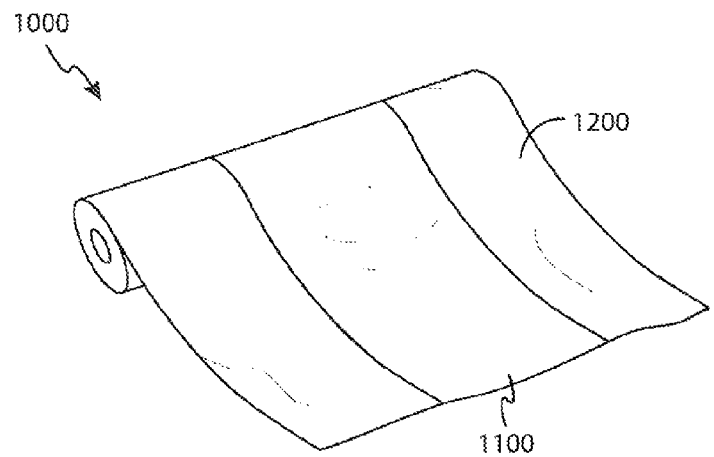
FIG. 1 is a perspective view of an apparatus, in a partially rolled configuration, for sealing the hatch of a hopper car.
Figure 2:
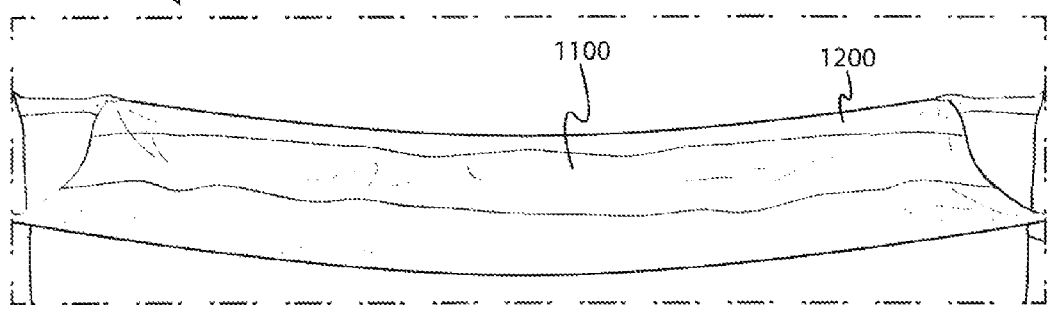
FIG. 2 is a top view of an unrolled apparatus of FIG. 1.

FIG. 1 is a perspective view of a seal 1000, in a rolled configuration, for a hopper car hatch. FIG. 2 is a top view of an the seal 1000 in an unrolled configuration. As shown, the seal 1000 is defined by: a sheet of plastic 1100; and food-grade adhesive 1200 that is lengthwise applied on one surface and along the edges of the plastic sheet. Suitably, the plastic is configured to be moisture and fumigant impervious. Preferably, the adhesive is food grade so that risk of contamination of the hopper load is minimized and so that the hopper car will not be damaged by the adhesive. In a preferred embodiment, the adhesive has a peel to stainless steel of 75 ounce per inch with a minimum application temperature of 50 degrees Fahrenheit). In a preferred embodiment, the adhesive is manufactured by the 3M Corporation.

Although the preferred embodiment is shown as being a single plastic sheet with adhesive applied to the sides thereof, it is contemplated that other embodiments may suitably be constructed wherein a sheet of seal material (e.g., a multiple layer zone lamination) may have strips of tape with food grade adhesive applied along its sides. In one embodiment the tape may be 4.6 mil thick (mil=10^−3 inches) and the seal material may be 4.0 mil thick.

Figure 3:
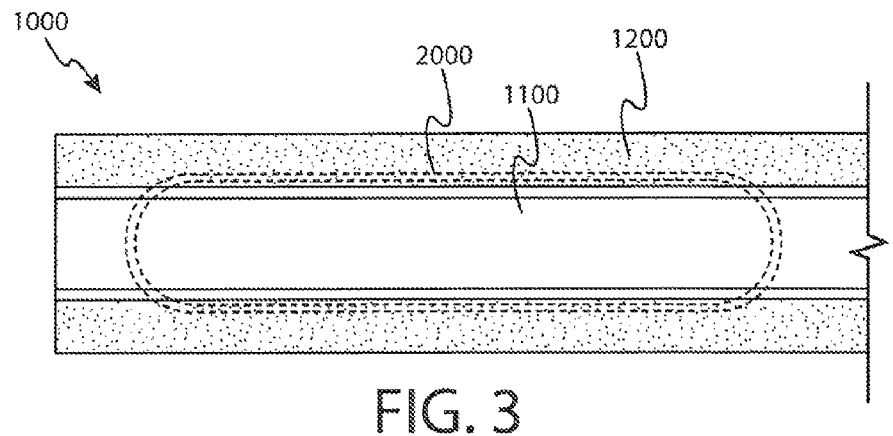
FIG. 3 is a top view of an unrolled apparatus of FIG. 1 positioned over a hatch of a hopper car.
Figure 4:
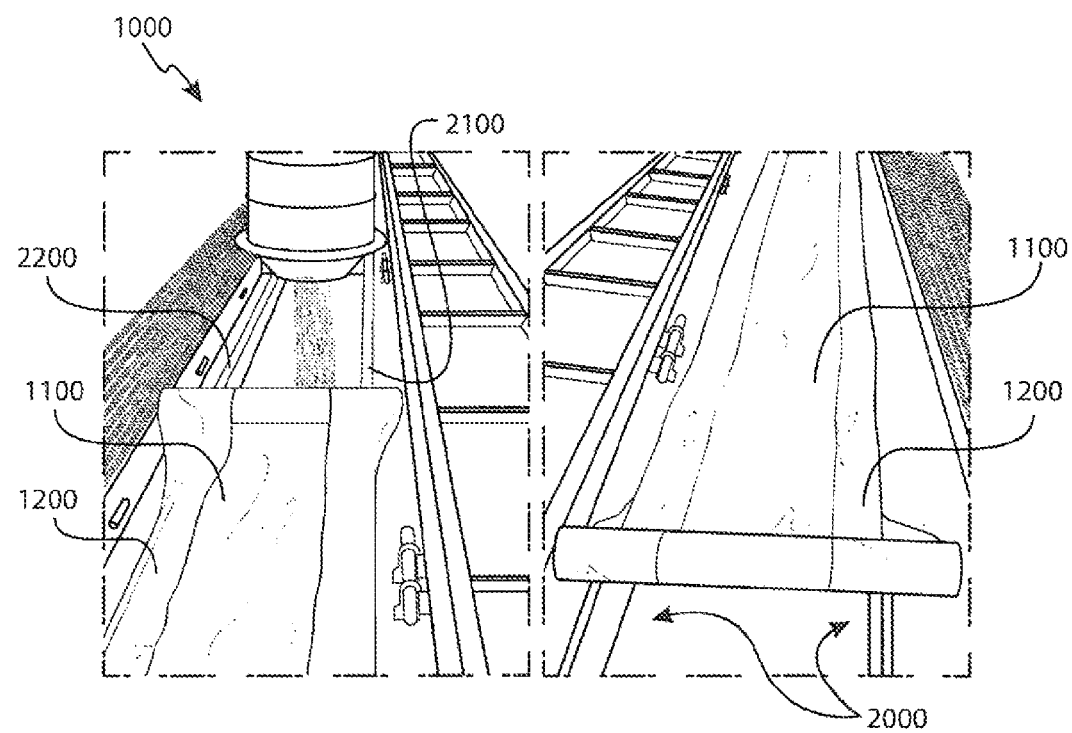
FIG. 4 is environmental views of a hopper car with the hatch being sealed by the disclosed apparatus of FIG. 1.
Figure 5:
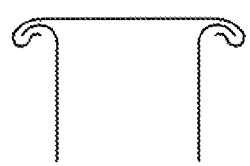
FIG. 5 is a cross section of the apparatus of FIG. 3 and the hopper car hatch of FIG. 3; and, FIG. 6 is perspective views of the installed apparatus over an end portion of the hopper car hatch of FIG. 3.
Figure 6:
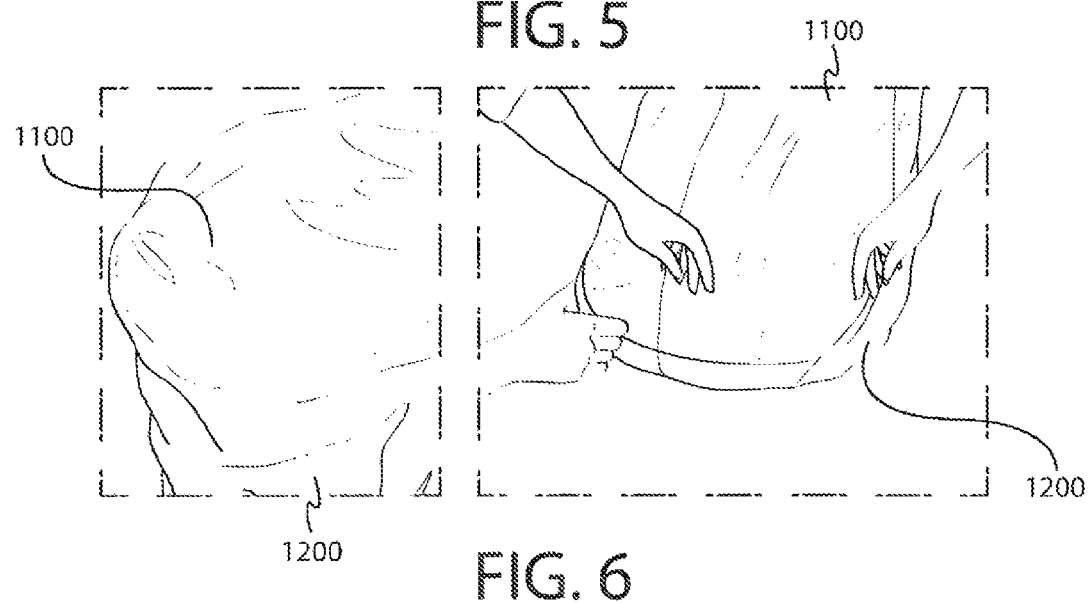

FIG. 3 is a top view of an unrolled seal 1000 positioned over a hatch 2000 of a hopper car. FIG. 4 is a cross section of the seal 1000 and hatch 2000. FIG. 5 is a cross-section of the seal 1000 as installed over the hatch 2000. FIG. 6 is a perspective view of the installed seal over an end portion of the hopper car hatch 2000. Taken together, the figures illustrate a preferred mode of instillation of the seal 1000 over a hatch 2000. Referring to FIG. 3, a seal 100 may first be unrolled over a hatch 2000. Suitably, the adhesive 1200 side may be down so that the adhesive portion 1200 is partially positioned over a rim 2100 of the hatch 2000. In one embodiment, the seal is pre-cut to the size of the hatch 2000, however it is contemplated that the seat may be unrolled and cut to appropriate sizes to account for variances in hopper hatch lengths. Referring to FIGS. 4 and 5, the adhesive portion 1200 of the seal 1000 may then be folded around the rim 2100 of the hatch 200 and adhered to the side 2200 of the hatch (see, e.g., FIG. 5). Referring to FIG. 6, only the lengthwise sides of the preferred embodiment of the seal feature adhesive so that the width of the seal 1000 that does not feature an adhesive must be locked by folding the adhesive portion 1200 of the seal 100 around the ends of the hatch 200 so that the same may adhere to the hatch sidewalls at the end of the hatch. 2000. Suitably, opposite corners of the plastic sheet 1100 should overlap at the adhesive portions 1200 so that a complete seal (shown in broken lines, FIG. 6) forms.

Other assembly methods may be practiced depending on the use of alternative embodiments described herein, and will be readily apparent to those skilled in the art.

I claim:

1. A method of sealing a hopper car hatch comprising the step of:
   obtaining a sheet of plastic with self-contained adhesive with two lengthwise and two widthwise sides, wherein the self-contained adhesive is applied on one surface and along the two lengthwise sides of the plastic sheet;
   positioning the sheet of plastic over the hopper car hatch; and
   adhering the plastic to at least a portion of the hopper car hatch via (a) folding the two lengthwise sides over a rim of said hatch and adhering the self-contained adhesive to corresponding lengthwise sidewalls of the hatch and (b) locking the widthwise sides of the sheet to corresponding widthwise sidewalls of the hatch by folding excess adhesive portions of the lengthwise sides of the plastic sheet around ends of said lengthwise sidewalls of the hatch so that said excess adhesive portions are adhered to the widthwise sidewalls of the hatch, wherein said excess portions overlap on the widthwise sidewalls.

2. The apparatus of claim 1 wherein the lengthwise sides of the sheet of plastic have a peel to steel of seventy-five ounces per inch.

3. A seal for a hopper car comprising:
   a sheet of plastic with a self contained adhesive disposed along two lengthwise sides of the sheet of plastic, wherein the sheet of plastic defines a seal of a hatch of a hopper car by (a) folding the two lengthwise sides over a rim of said hatch and adhering the self-contained adhesive to corresponding lengthwise sidewalls of the hatch and (b) locking two widthwise sides of the sheet to corresponding widthwise sidewalls of the hatch by folding excess adhesive portions of the lengthwise sides of the plastic sheet around ends of said lengthwise sidewalls of the hatch so that said excess adhesive portions are adhered to the widthwise sidewalls of the hatch, wherein said excess portions overlap on the widthwise sidewalls.

4. The apparatus of claim 3 wherein the lengthwise sides of the sheet of plastic have a peel to steel of seventy-five ounces per inch.

5. An apparatus comprising:
   a sheet of plastic; and,
   an adhesive disposed on two lengthwise sides of the sheet of plastic said plastic provided over a hopper car hatch by (a) folding the two lengthwise sides over a rim of said hatch and adhering the self-contained adhesive to corresponding lengthwise sidewalls of the hatch and (b) locking two widthwise sides of the sheet to corresponding widthwise sidewalls of the hatch by folding excess adhesive portions of the lengthwise sides of the plastic sheet around ends of said lengthwise sidewalls of the hatch so that said excess adhesive portions are adhered to the widthwise sidewalls of the hatch, wherein said excess portions overlap on the widthwise sidewalls.

6. The apparatus of claim 5 wherein the plastic is cut to fit the hopper car hatch.

7. The apparatus of claim 5 wherein the adhesive is food-grade.

8. The apparatus of claim 7 wherein the lengthwise sides of the sheet of plastic have a peel to steel of seventy-five ounces per inch.

9. The apparatus of claim 5 wherein plastic is configured for installation over a hatch opening so that the side of the apparatus containing adhesive is contacted with the rim and sides of the hopper car hatch.

\* \* \* \* \*